(12) United States Patent
Strand et al.

(10) Patent No.: US 11,312,452 B2
(45) Date of Patent: Apr. 26, 2022

(54) HOISTING SYSTEM AND METHOD FOR HOISTING A VERTICALLY-SUSPENDED OBJECT

(71) Applicant: National Oilwell Varco Norway AS, Kristiansand S (NO)

(72) Inventors: Thor Strand, Kristiansand (NO); Frank Tønnessen, Grimstad (NO)

(73) Assignee: National Oilwell Varco Norway AS, Kristiansand S (NO)

( * ) Notice: Subject to any disclaimer, the term of this patent is extended or adjusted under 35 U.S.C. 154(b) by 0 days.

(21) Appl. No.: 17/152,226

(22) Filed: Jan. 19, 2021

(65) Prior Publication Data

US 2021/0221659 A1 Jul. 22, 2021

(30) Foreign Application Priority Data

Jan. 22, 2020 (EP) .................................. 20153151

(51) Int. Cl.
*B63B 21/20* (2006.01)
*B65G 67/60* (2006.01)
(Continued)

(52) U.S. Cl.
CPC .............. *B63B 21/20* (2013.01); *B65G 67/60* (2013.01); *B66C 23/52* (2013.01); *B66D 1/30* (2013.01); *B66C 13/02* (2013.01)

(58) Field of Classification Search
CPC ......... B63B 21/16; B63B 27/08; B63B 21/20; B63B 2205/00; B63B 2205/02; B63B 2207/02; B63B 2209/00; B66C 23/52; B63G 8/001; B63G 2008/002; B63G 2008/007; B66D 1/30; B65G 67/60;
(Continued)

(56) References Cited

U.S. PATENT DOCUMENTS 3,809,334 A 5/1974 Beurer et al.
9,463,849 B2 * 10/2016 McCabe ................ B63G 8/001
(Continued)

FOREIGN PATENT DOCUMENTS

WO 2010093251 8/2010
WO 2018131995 7/2018

OTHER PUBLICATIONS

The Extended European Search Report for EP 20153151.4, dated Jul. 29, 2020.

*Primary Examiner* — Gregory W Adams
(74) *Attorney, Agent, or Firm* — Andrus Intellectual Property Law, LLP

(57) ABSTRACT

A hoisting system is for hoisting a vertically-suspended object. The hoisting system has a winch having a winch drum with a hoisting rope. A first part of the hoisting rope has a first diameter and a second part has a second diameter being larger than the first diameter. The first part is connected with a first end of the second part. The first part is an inner part on the winch drum when the winch drum is completely wound. The second part has a further end that is connectable to the object for hoisting the object. A ratio between the first diameter and the second diameter is such that the minimum breakable load of the first part differs less than a factor of four from the minimum breakable load of the second part, and preferably less than a factor of three. A corresponding method is disclosed.

15 Claims, 7 Drawing Sheets

(51) Int. Cl.
 *B66C 23/52* (2006.01)
 *B66D 1/30* (2006.01)
 *B66C 13/02* (2006.01)

(58) Field of Classification Search
 CPC . D07B 1/02; D07B 1/025; D07B 1/20; D07B 2205/2046; D07B 2205/205; D07B 1/005; D07B 1/04; D07B 1/00; D07B 2501/2061; D07B 2801/24
 See application file for complete search history.

(56) References Cited

U.S. PATENT DOCUMENTS

| | | |
|---|---|---|
| 2002/0166998 A1 | 11/2002 | Selcer et al. |
| 2003/0221602 A1* | 12/2003 | Guinn .................. E21B 19/002 |
| | | 114/258 |
| 2010/0054079 A1* | 3/2010 | Thompson ........... H01R 13/533 |
| | | 367/20 |
| 2014/0348593 A1 | 11/2014 | Kawahara et al. |

* cited by examiner

HOISTING SYSTEM AND METHOD FOR HOISTING A VERTICALLY-SUSPENDED OBJECT

CROSS-REFERENCE TO RELATED APPLICATION

This application claims the benefit of and priority from European Patent Application No. 20153151.4, filed Jan. 22, 2020 in the European Patent Office. The European application is incorporated herein by reference, in entirety.

FIELD

The invention relates to a hoisting system for hoisting a vertically-suspended object, the hoisting system having a winch having a winch drum with a hoisting rope. The invention further relates to a method for hoisting a vertically-suspended object with such hoisting system.

BACKGROUND

Hoisting systems for hoisting vertically-suspended objects are known from the prior art. Examples of such hoisting systems are cranes, A-frames with winches mounted on them and overboard sheaves combined with winches. Such hoisting systems may typically be placed on vessels, platforms, semis and jack-up rigs. In addition these hoisting systems may be placed at or over a moon pool or they operate directly over the sea via further sheaves that are guiding a hoisting rope from a winch to the operation point. An example hoisting system may be a crane, which typically comprises a crane pedestal, a main boom pivotable connected to the crane pedestal, a knuckle-boom (or jib) pivotable connected to the main boom. Such crane further comprises a winch having a winch drum with a hoisting rope. The hoisting rope is typically guided from the winch along the main boom and knuckle-boom to the boom tip at the end of the knuckle-boom. Wire sheaves are generally placed along this path to guide the hoisting rope.

The known hoisting systems function well, but their winches may become very bulky (and thereby costly) due to the required length and thickness of the hoisting rope, which is to be designed for the minimum breakable load required by the application. This is particularly so for offshore hoisting systems, wherein lengths of the hoisting rope may be up to several kilometers in order to be able to reach the seabed.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect the invention relates to a hoisting system for hoisting a vertically-suspended object, the hoisting system having a winch having a winch drum with a hoisting rope. A first part of the hoisting rope has a first diameter and a second part has a second diameter being larger than the first diameter, the first part being connected with a first end of the second part. Furthermore, the first part is an inner part of the winch drum when the winch drum is completely wound. The second part has a further end that is connectable to the object for hoisting the object, wherein a ratio between the first diameter and the second diameter is chosen such that the minimum breakable load of the first part differs less than a factor of four from the minimum breakable load of the second part, and preferably less than a factor of three.

The effects of the hoisting system in accordance with the invention are as follows.

The first important feature of the invention is that the hoisting rope on the winch comprises at least two parts having different diameter, wherein the inner part of the winch (that is un-wound the latest) comprises the thinner part of the hoisting robe. Furthermore, the diameters are chosen such that the minimum breakable load between said parts does not differ more than a factor of four, and preferably less than a factor of three. The inventors have realized that this combination of features leads to an enormous advantage in offshore hoisting applications. When a heavy and bulky load is hoisted offshore, either lifted from the seabed or placed onto the seabed the buoyancy forces acting by the water on the object cause the load on the hoisting rope to be significantly smaller. In certain applications the inventors have seen a 66-ton-weighing object (in air) resulting in a 20-ton load on the hoisting rope (and hoisting system) when the object is fully submerged under water. This is a factor of 3.3 difference, even though in most applications the weight reduction will be between 20% and 50%, resulting in ratio of the minimum breakable load (of the first and second part) between about 1.2 and 2. The inventors came to the realization that this opens up the possibility to exploit this effect. Instead of designing the complete hoisting rope for the 66-ton load capacity the major part of the hoisting rope may be designed for a much smaller load. In practical applications the second part does not need to be longer than 200 meters or 300 meters. The remainder, which may easily have lengths up to several thousands of meters may be designed with a significantly smaller diameter. Consequently the winch may be designed much smaller and additionally a lot of material (and costs) are saved for the hoisting rope material. The latter effect is in fact quite large as hoisting rope is very costly, particularly fiber ropes. Nevertheless for metal ropes the impact is also quite large. The invention is therefore not limited to any specific type of hoisting rope.

In order to facilitate understanding of the invention one or more expressions are further defined hereinafter.

A few definitions and expressions as used throughout this specification are defined hereinafter.

Wherever the word "rope" is used, this is to be interpreted as similar to the words cable and wire.

In an embodiment of the hoisting system in accordance with the invention the length of the second part of the hoisting rope is chosen such that, while, in operational use, the object is suspended in the hoisting rope and touches the water, the second part remains wound around the winch drum with at least a predefined number of windings and stretches all the way from the winch drum along the hoisting system and down to the further end of the hoisting rope near the water. The advantage of this embodiment is that it creates a safety zone during the hoisting where an effective minimum breakable strength of the hoisting rope is maintained higher in the transition from air-suspended to submerged load. In addition for the second part to be used as hoisting rope it needs to be wound around the winch at least a predefined number of times in order to create enough friction on the winch. In practical applications this may be 5 times or more, for example.

In an embodiment of the hoisting system in accordance with the invention the second part has a length between 10 and 500 meters, and preferably between 10 and 400 meters, and even more preferably between 10 and 300 meters. This embodiment gives the range for the length of the second part, which is suitable for most applications.

In an embodiment of the hoisting system in accordance with the invention the first part has a length between 10 and 10000 meters, and preferably between 20 and 5000 meters, and even more preferably between 30 and 3000 meters. This embodiment gives the range for the length of the first part, which is suitable for most applications.

In an embodiment of the hoisting system in accordance with the invention the first diameter of the first part of the hoisting rope is between 5 mm and 300 mm. This embodiment gives the range for the diameter of the first part, which is suitable for most applications.

In an embodiment of the hoisting system in accordance with the invention the second diameter of the second part of the hoisting rope is between 25 mm and 500 mm. This embodiment gives the range for the diameter of the suitable part, which is suitable for most applications.

In a second aspect the invention relates to a method for hoisting a vertically-suspended object with a hoisting system, the hoisting system having a winch having a winch drum with a hoisting rope. A first part of the hoisting rope has a first diameter and a second part has a second diameter being larger than the first diameter, the first part being connected with a first end of the second part. Furthermore, the first part is an inner part on the winch drum when the winch drum is completely wound. The second part has a further end that is connectable to the object for hoisting the object, wherein a ratio between the first diameter and the second diameter is chosen such that the minimum breakable load of the first part differs less than a factor of four from the minimum breakable load of the second part, and preferably less than a factor of three. The method comprises a step of hoisting the object either into or from the water, in such a way that the second part of the winch drum is always at least partially wound on the winch drum before the object is lifted out of the water during lifting of the object, and that the first part is not unwound from the winch drum before the object is fully submerged in the water during lowering of the object. Even though ropes with parts with unequal diameter have been reported before, these ropes were not used in hoisting methods, and particularly not in hoisting methods, wherein the load re-mains vertically suspended in the hoisting rope both in air as well as when being sub-merged. The latter is exactly the application area where the benefits of the hoisting system (and winch) in accordance with the other aspects of the invention are most profound.

In an embodiment of the method in accordance with the invention the method comprises steps of: mounting an object resting on a first surface at a first position to the further end of the hoisting rope, wherein the second part has been partially unwound from the winch drum; lifting the object with the winch from the first surface to suspend the object in the hoisting rope, wherein the second part remains partially wound on the winch drum, wherein during the lifting the second part carries the full weight of the object; moving the hoisting system to a second position above water, wherein the second part carries the full weight of the object; lowering the object with the winch until it is fully submerged in the water, wherein the second part remains at least partially wound on the winch drum until the object is fully submerged; and further lowering the object with the winch into the water completely unwinding the second part and at least partially unwinding the first part from the winch drum, wherein the first part is exposed to a reduced effective weight of the object due to buoyancy forces acting by the water on the object and the hoisting rope. This embodiment of the method concerns the lowering of the object into the water, i.e. to be placed on the seabed. As soon as the water is touched the buoyance forces will help by reducing the effective weight (load) on the hoisting rope, which enables using the thinner part (first part) of the hoisting rope for hoisting when the object is fully submerged. The step of moving the hoisting system to the second position may be optional in embodiments where the hoisting system is provided over a moon pool or directly above water.

In an embodiment of the method in accordance with the invention, in the step of lowering the object, at least a predefined number of windings of the second part remain on the winch drum until the object is exactly fully submerged. The advantage of this embodiment is that it creates a safety zone during the hoisting where an effective minimum breakable strength of the hoisting rope is maintained higher in the transition from air-suspended to submerged load. In addition, for the second part to be used as hoisting rope, it needs to be wound around the winch at least a predefined number of times in order to create enough friction on the winch. In practical applications this may be 5 times or more, for example.

In an embodiment of the method in accordance with the invention the method comprises steps of: mounting an object that is submerged in water at a second position to the further end of the hoisting rope, wherein the second part has been fully unwound and the first part has been at least partially unwound from the winch drum; lifting the object with the winch to suspend the object in the hoisting rope, wherein the first part is wound on the winch drum until the second part is partially wound on the winch drum while the object is still submerged, wherein during the lifting the first part carries a reduced effective weight of the object due to buoyancy forces acting by the water on the object and the hoisting rope; further lifting the object with the winch out of the water, wherein the second part is being further wound on the winch drum; moving the hoisting system to a first position, wherein the second part carries the full weight of the object; and lowering the object with the winch to touch a first surface at the first position, wherein still only the second part is partially unwound from the winch drum. This embodiment of the method concerns the lifting of the object out of the water, i.e. to be taken from the seabed. While submerged the buoyance forces acting on the object will help by reducing the effective weight (load) on the hoisting rope, which enables using the thinner part (first part) of the hoisting rope for hoisting when the object is fully submerged. Then as soon as the surface of the water is approached the second part is being wound on the winch drum, such that the load can be lifted out of the water using the second part only. The step of moving the hoisting system to the first position may be optional in embodiments where the hoisting system is provided over a moon pool or directly above water.

In an embodiment of the method in accordance with the invention, in the step of lifting the object, at least a predefined number of windings of the second part are wound on the winch drum before the object is no longer fully submerged. The advantage of this embodiment is that it creates a safety zone during the hoisting where an effective minimum breakable strength of the hoisting rope is maintained higher in the transition from air-suspended to submerged load. In addition for the second part to be used as hoisting rope it needs to be wound around the winch at least a predefined number of times in order to create enough friction on the winch. In practical applications this may be 5 times or more, for example.

In a third aspect the invention relates to a winch having a winch drum with a hoisting rope, wherein a first part of the hoisting rope has a first diameter and a second part has a second diameter being larger than the first diameter, the first part being connected with a first end of the second part. Furthermore, the first part is an inner part on the winch drum when the winch drum is completely wound. The second part has a further end that is connectable to the object for hoisting the object, wherein a ratio between the first diameter and the second diameter is chosen such that the minimum breakable load of the first part differs less than a factor of four from the minimum breakable load of the second part, and preferably less than a factor of three. The invention may also be applied to hoisting systems without booms. The third aspect provides for the features required to apply the invention in those applications as well. The embodiments of the winch in accordance with the invention are the same as the embodiments mentioned for the hoisting system in accordance with the invention, as all features are related to the winch on that hoisting system.

BRIEF DESCRIPTION OF THE DRAWINGS

In the following is described examples of embodiments illustrated in the accompanying drawings, wherein.

DETAILED DESCRIPTION

Figure 1:
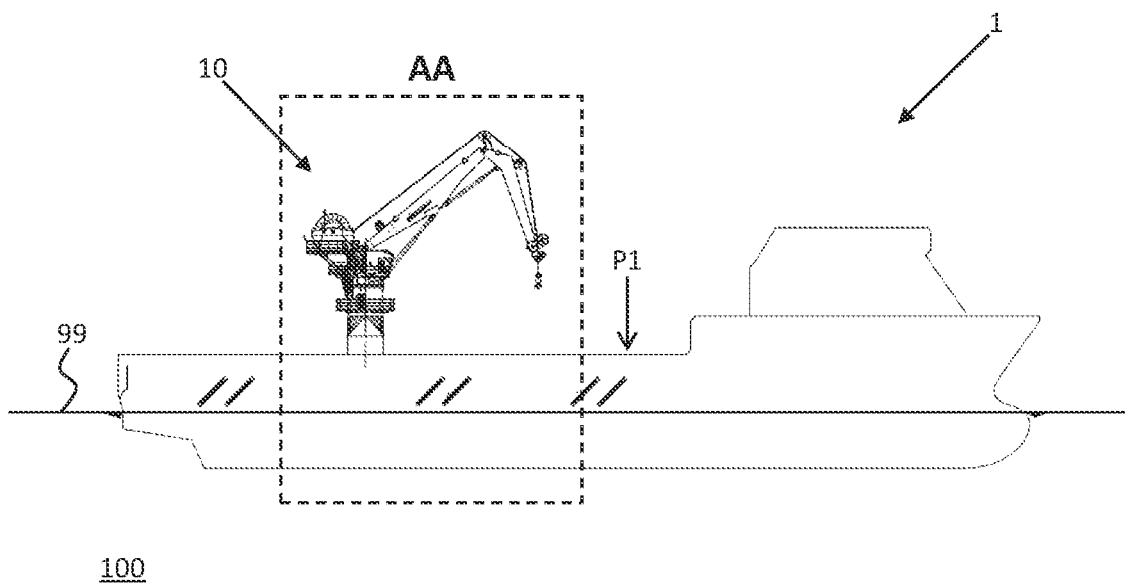
FIG. 1 shows an application field of the invention.

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In this invention a hoisting rope used for subsea load handling (offshore). Subsea load handling is normally based on a winch and a rope for lowering and hoisting a load to and from a seabed. As discussed in the introduction these load handling systems are often operated from a floating vessel or platform. The hoisting heights are depending on the depths in the operation area. Typical hoisting heights (depths) for a global operating vessel is 3000 m.

Traditional hoisting systems use steel wire ropes as a load carrier. These systems have several challenges, such as weight of the rope, corrosion and fatigue during active-heave compensation (AHC). The main advantages of such systems are robustness, well-known and established technology and several decades of experience.

Future hoisting system are going in a direction of using fiber ropes replacing the traditional steel wire ropes. These hoisting ropes may be based on different materials or a combination of these. The main advantages of fiber ropes are light weight (neutral in water), no corrosion issues, possible to transfer data signals through optionally-integrated cables, more accurate condition monitoring, possibilities to replace damaged part of the rope by splicing. Disadvantages are rope size, high cost, temperature sensitive, more fragile ropes, less experience from subsea load handling systems and the need for larger bending radius hence large sheaves and drums.

Furthermore, as the vessel is floating, an Active Heave Compensating system (AHC) is a typical part of the system for safe load handling.

The inventors got the insight that when an item is lowered into water the weight is reduced due to buoyancy from the displaced water. The main idea in the invention is to use a rope with two different diameters and different Minimum Braking Load (MBL) to utilize the effect from buoyancy. The outer part of the hoisting rope (closest to the load) needs a higher MBL as this part of the rope is used for load handling in air. In most embodiments this part should have a length of about 100 m to 200 m rope, depending of the hoisting system configuration and size. The remaining part of the hoisting rope is used for load handling when the load is submerged in water, hence experiencing a reduced load and lower MBL requirements. This is the largest part of the rope and in most embodiments between 1500 m and 3000 m length.

One benefit of the invention is the reduced rope weight, but the main advantage is the reduced overall cost and size of the hoisting system (i.e. crane). The hoisting rope determines a major part of the total cost, and by reducing the hoisting rope diameter the winch may be downsized as the rope diameter is a design factor for determining the required dimension of the winch drum and rope sheaves. These reductions also affect the overall cost and size of the total hoisting system.

The invention may be used in connection with hoisting systems (i.e. cranes, A-frames with winches mounted on them, and overboard sheaves combined with winches), where fiber ropes are used for load handling offshore, but the invention also applies to steel ropes.

FIG. 1 shows an application field of the invention. This application field as earlier discussed concerns a floating vessel 1 (i.e. a boat, barge or platform) floating on water 100 (sea, lake, fjord and the like) as illustrated. The floating vessel 1 has a crane 10 on its deck as illustrated. Typically such vessels comprise storage place for storing objects (not shown) that either are to be placed on the seabed or have been taken from the seabed. In the claims this place is referred to as the "first location" P1 of the object. FIG. 1 further illustrates the surface 99 of the water 100.

Figure 2:
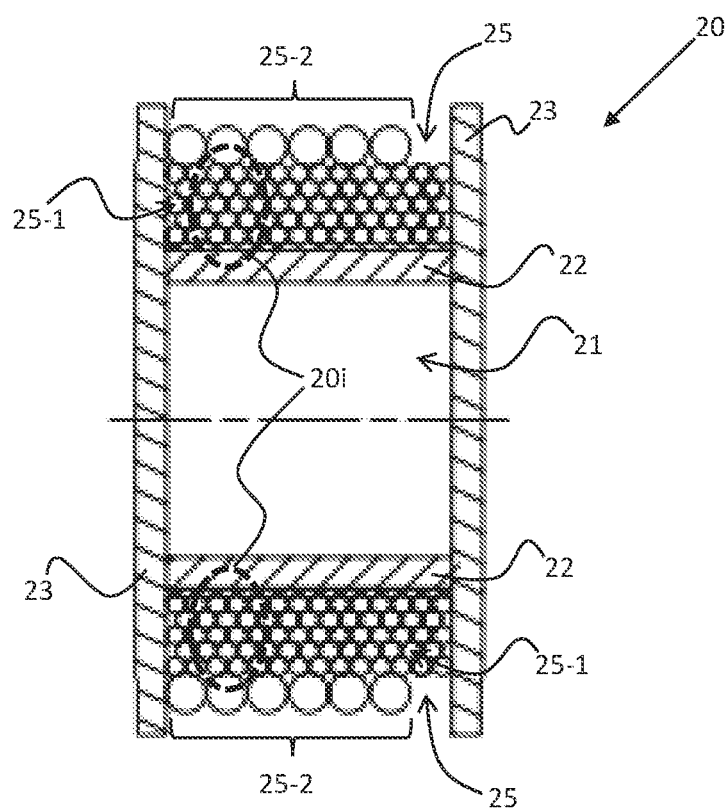
FIG. 2 shows a winch in accordance with an embodiment of the invention.

FIG. 2 shows a winch 20 in accordance with an embodiment of the invention. For the sake of simplicity only the winch drum 21 of the winch 20 is shown. This figure illustrates an important aspect of the invention, which concerns the hoisting rope 25 that is wound on the winch drum 21. The winch drum 21 comprises several known parts such as the winch drum cylinder 22 and the winch drum flanges 23. This is all considered known to the person skilled in the art. The hoisting rope 25 comprises a first part 25-1 that is connected to a second part 25-2. The first part 25-1, that is located on the inner side 20i of the winch drum 21, comprises a smaller diameter than the second part 25-2. This means that when the winch 21 is being unwound first the second part 25-2 with the larger diameter is unwound, and then then the first part 25-1 with the smaller diameter is unwound. This feature is conveniently used in the current invention as will be explained with reference to FIGS. 3-6.

Figure 3:
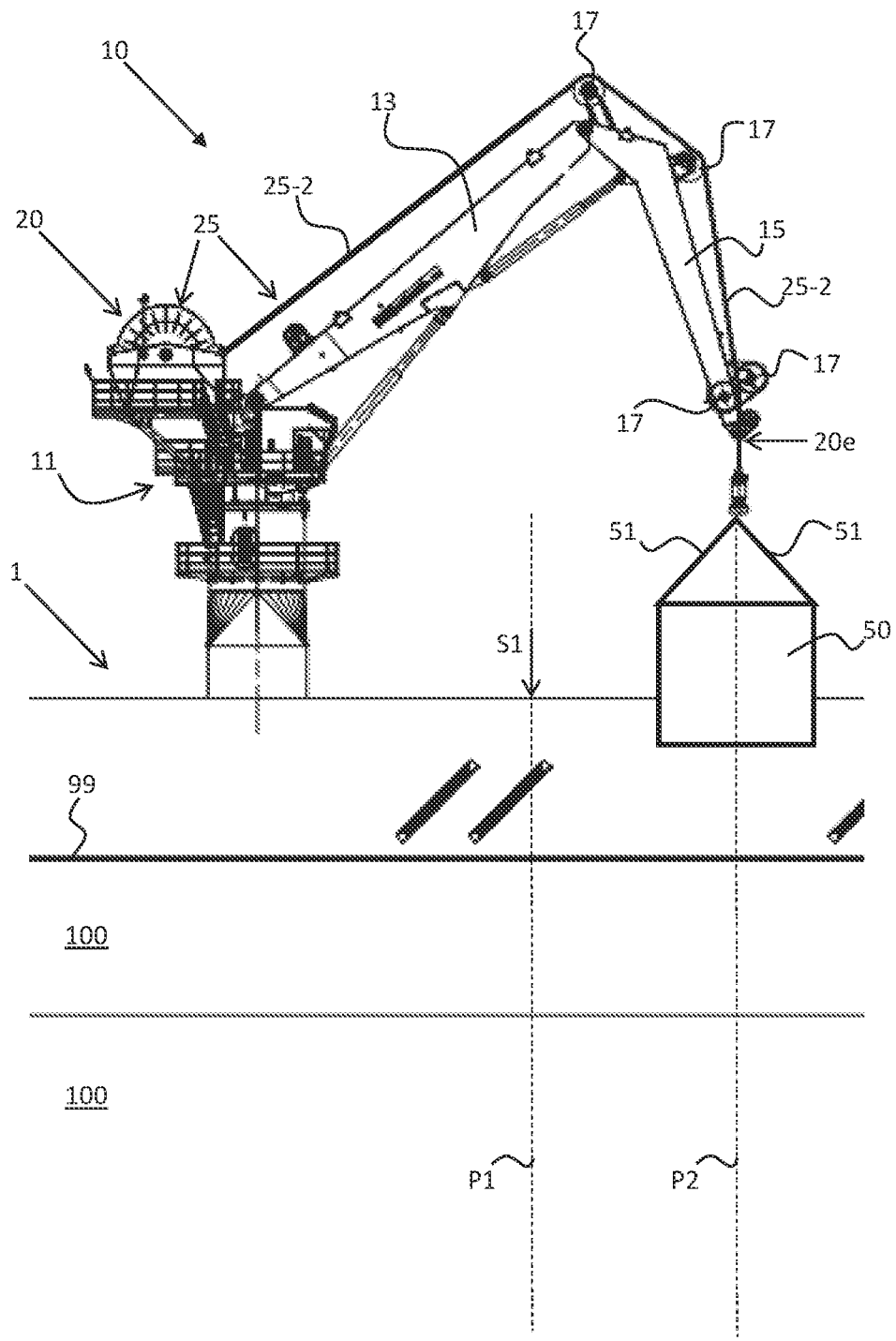
FIGS. 3-6 show different stages of a method in accordance with an embodiment of the invention.

FIGS. 3-6 show different stages of a method in accordance with an embodiment of the invention. These figures effectively show part AA of FIG. 1. In the stage illustrated in FIG. 3 the floating vessel 1 of FIG. 1 is shown, wherein an object 50 (a load) has been vertically suspended using suspension ropes 51 in the crane 10 as illustrated. The crane 10 has a known configuration comprising a crane pedestal 11 to which a main boom 13 is pivotably mounted. Furthermore, a knuckle-boom 15 (or jib) is pivotably mounted to the main boom Furthermore the winch 20 is visible, which includes the hoisting rope 25, which is guided using a plurality of wire sheaves 17 to a boom tip 20e at the end of the knuckle boom 15 as illustrated. So far, everything described is known in the field of cranes for off-shore/subsea hoisting. What is special in the crane 10 of FIG. 3 is that the winch 20 with the hoisting rope 25 is the same as shown in FIG. 2, having the respective first part 25-1 and second part 25-2, wherein first part 25-1 has the smallest diameter. In the stage of FIG. 3, wherein the object 50 is still suspended in the hoisting rope and hanging in the air above the surface 99 of the water 100, the second part 25-2 is still partially wound on the winch 20. This means that it is the second part 25-2, which carries the full load, i.e. full weight of the object 50 that is hanging in the air.

The figure illustrates a surface 51 of the floating vessel 1 on a first position P1, where the object 50 was taken from, before it was vertically suspended in the crane 10. Furthermore, the object 50 has already been moved to a second position P2 different from the first position P1 as illustrated.

Figure 4:
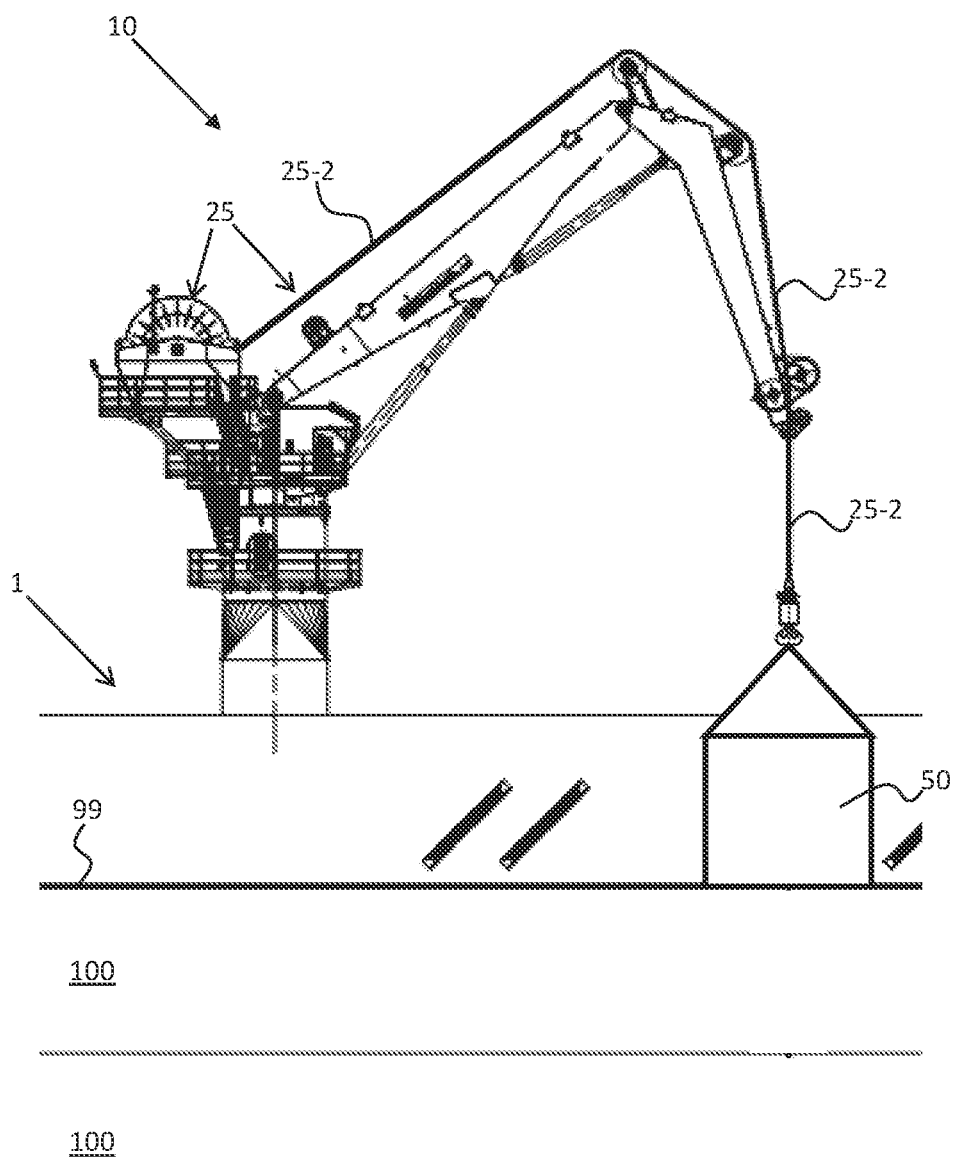

In the stage illustrated in FIG. 4, the object 50 has been lowered such that it touches the surface 99 of the water 100. In this stage the second part 25-2 is still partially wound on the winch 20. This means that it is still the second part 25-2, which substantially carries the full load, i.e. full weight of the object 50 that is hanging in the air.

Figure 5:
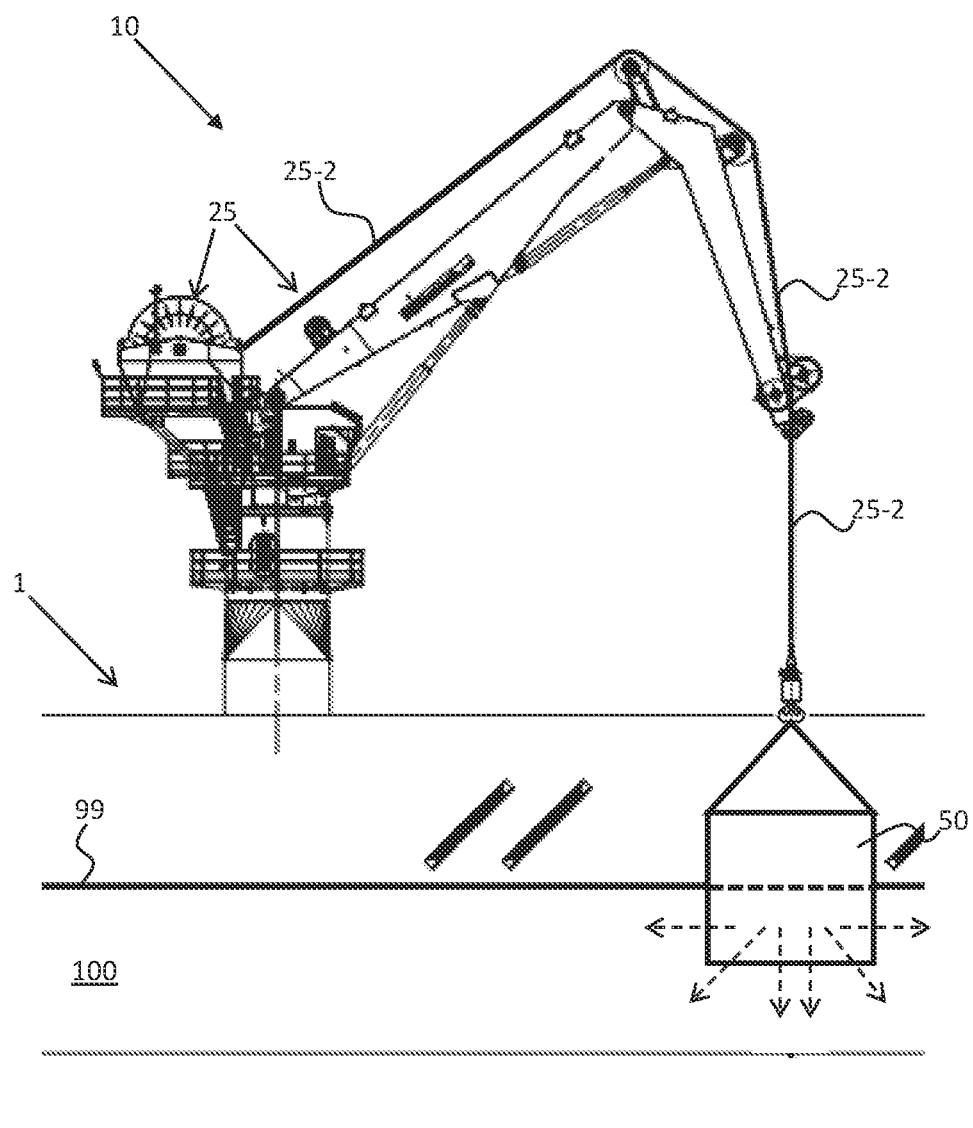

In the stage illustrated in FIG. 5, the object 50 has been lowered such that it is partially submerged in the water 100. The arrows illustrate the water 100 that has been pushed away by the object 50, thereby creating upwardly-directed buoyancy forces. Now the weight (load) acting on the hoisting rope 25 is reduced by the buoyancy forces. Yet, still the second part 25-2 is partially wound on the winch 20 in this embodiment. The main rea-son for this is that the effective weight of the object 50 (load) on the hoisting rope 25 is still larger than the minimum breakable load of the first part (not shown) of the hoisting rope Thus it is still the second part 25-2 of the hoisting rope 25 that is to carry the load.

Figure 6:
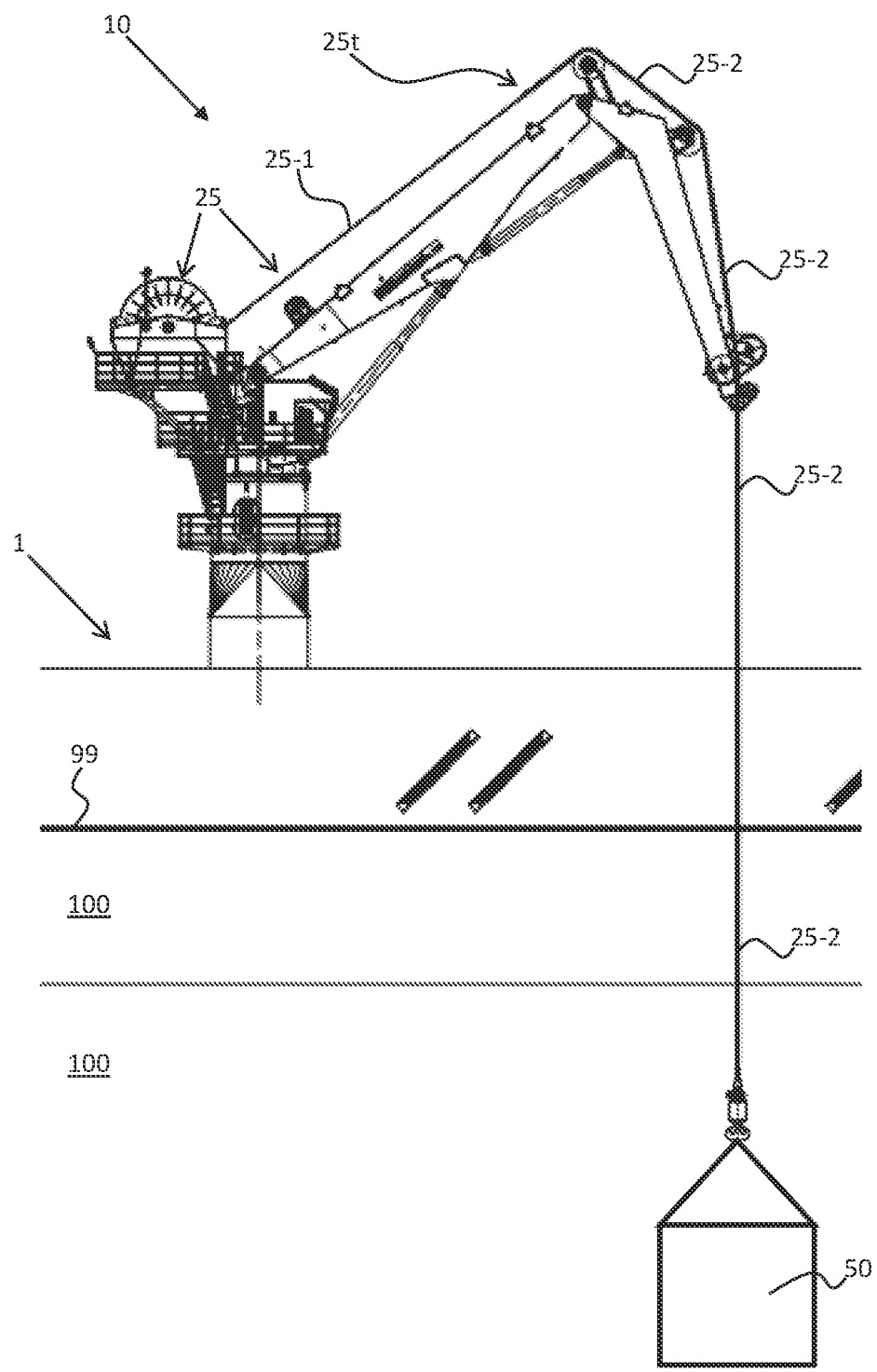

In the stage illustrated in FIG. 6, the object 50 has been lowered to underneath the surface 99 of the water 100, i.e. it is fully submerged. Theoretically the crane 10 could be designed such that the second part 25-2 of the hoisting rope 25 is fully unwound as soon as the object is just fully submerged. However, the inventors have found out that it is safe to keep a certain safety margin, that is that the second part 25-2, should preferably not be fully unwound until the object 50 has reached a predefined depth under the surface 99 of the water 100. It is at that point that the first part 25-1 and a transition region 25t of the hoisting rope 25 will be visible as illustrated in FIG. 6. The transition region 25t may be a tapered region, but also other solutions are possible as will be shown in the next figures.

Figure 7:
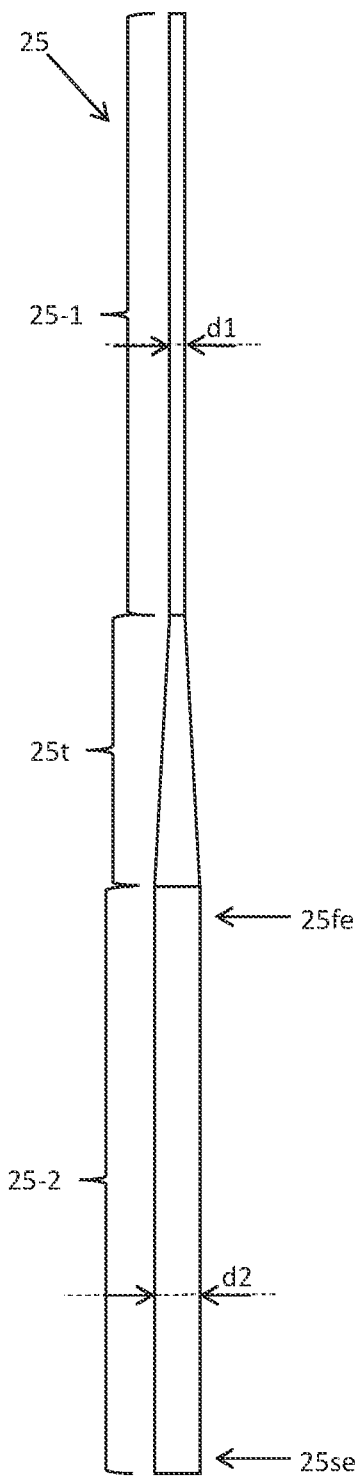
FIG. 7 shows a first variant of a hoisting rope in accordance with an embodiment of the invention.

FIG. 7 shows a first variant of a hoisting rope 25 in accordance with an embodiment of the invention. In this variant the first part 25-1 and the second part 25-2 are connected through a tapered transition region 25t as illustrated. The length of the transition region may vary and will also depend on the ratio between a (first) diameter d1 of the first region 25-1 and a (second) diameter d2 of the second region 25-2. FIG. 7 also illustrates what is meant by a first end 25fe of the second part 25-2 that is connected to the first part 25-1 (via the transition region 25t), and a further end 25se at the side of the object/load (not shown).

Figure 8:
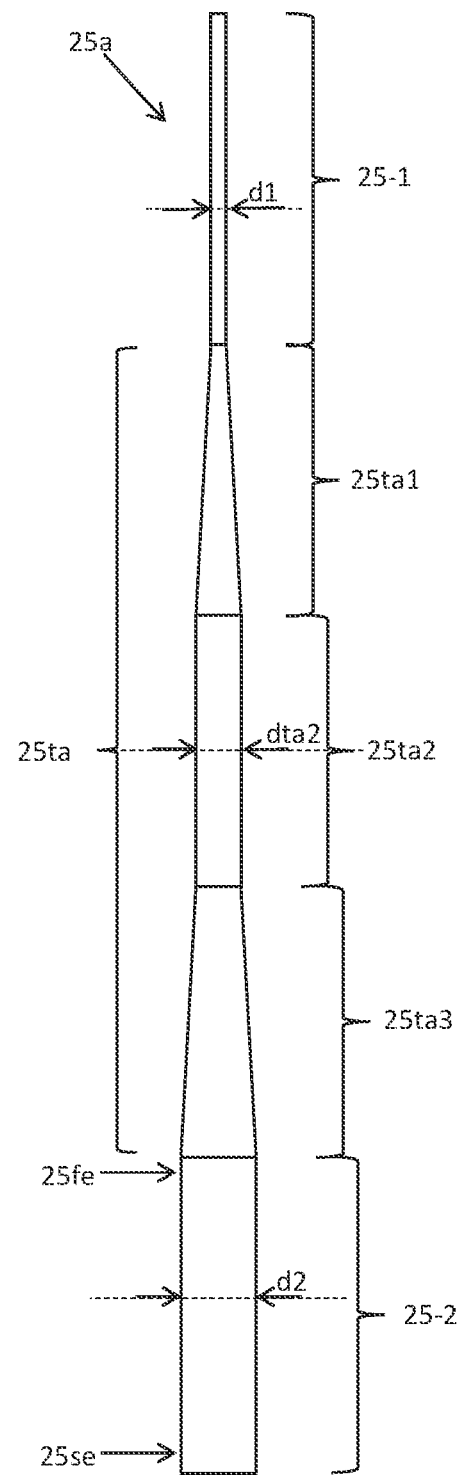
FIG. 8 shows a second variant of a hoisting rope in accordance with an embodiment of the invention.

It goes without saying that many variants of the hoisting rope 25 are possible. FIG. 8 shows a second variant of a hoisting rope 25a in accordance with an embodiment of the invention. The first end 25fe and further end 25se of the second part 25-2 are defined in a similar manner as in FIG. 7. A main difference is the adapted transition region 25ta, which now comprises a first tapered part 25ta1 and a second tapered part 25ta3 which are connected by a cylindrical part 25ta2 as illustrated. The respective diameters d1, d2 of the first and second parts have also been illustrated. A diameter dta2 of the cylindrical part 25ta2 is chosen between the first diameter d1 and the second diameter d2. One might also define the hoisting rope 25a of FIG. 8 as having at least three different parts having different diameters. This is a matter of definition. The definition chosen here is in accordance with the claims, which define at least two different diameters.

Figure 9:
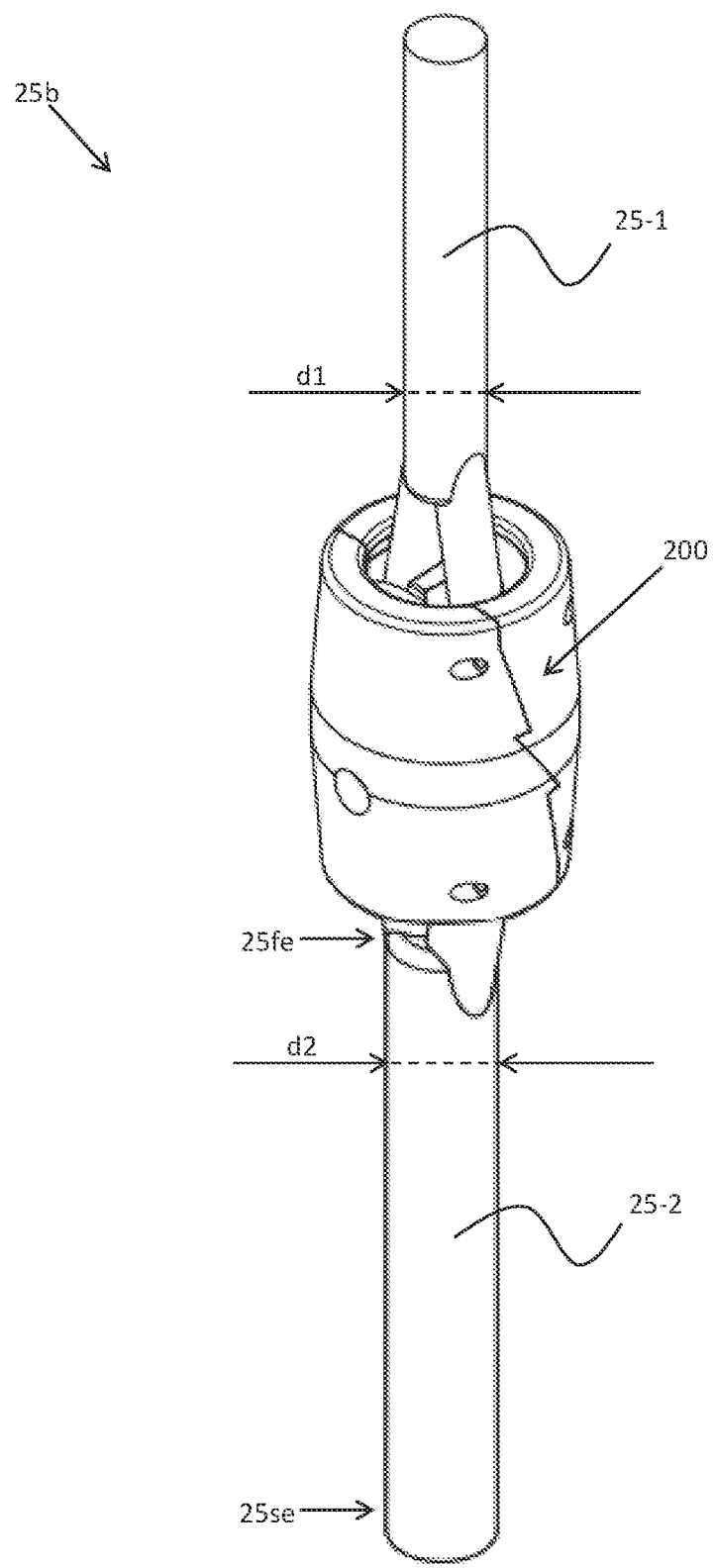
FIG. 9 shows a third variant of a hoisting rope in accordance with an embodiment of the invention.

There are other ways of making transitions between two parts 25-1, 25-2 of a hoisting rope 25 having a different diameter. FIG. 9 shows a third variant of a hoisting rope 25b in accordance with an embodiment of the invention. The first end 25fe and further end 25se of the second part 25-2 are defined in a similar manner as in FIGS. 7 and 8. This variant uses a technology which has been used in rope extension systems as known from patent application publication WO2010/093251A1, owned by the same applicant. In this document a steel rope is extended using a fiber rope from a further winch. This fiber rope comprises multiple segments that are connected together using a rope connector that holds spliced ends of the fiber rope segments. This rope connector 200 may conveniently be used to make the transition between the first part 25-1 and the second part 25-2 of the hoisting rope 25 as illustrated. For details on the rope connector, including how it is built up and is connected, reference is made to the earlier-mentioned patent application publication WO2010/093251A1.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. In the device claim enumerating several means, several of these means may be embodied by one and the same item of hardware.

The invention claimed is:

1. A hoisting system for hoisting a vertically-suspended object, the hoisting system having a winch having a winch drum with a hoisting rope, wherein a first part of the hoisting rope has a first diameter and a second part has a second diameter being larger than the first diameter, the first part being connected with a first end of the second part, at a transition region, the transition region including at least one tapering region and having diameters at opposite end corresponding to the first diameter and the second diameter respectively, wherein the first part is an inner part on the winch drum when the winch drum is completely wound, wherein the second part has a further end that is connectable to the object for hoisting the object, wherein a ratio between the first diameter and the second diameter is chosen such that the minimum breakable load of the first part differs less than a factor of four from the minimum breakable load of the second part.

2. The hoisting system according to claim 1, wherein the length of the second part of the hoisting rope is such that, while, in operational use, the object is suspended in the hoisting rope and touches the water, the second part remains wound around the winch drum with at least a pre-defined of windings and stretches from the winch drum along the hoisting system and down to the further end of the hoisting rope near the water.

3. The hoisting system according to claim 2, wherein the second part has a length between 10 and 500 meters.

4. The hoisting system according to claim 1, wherein the first part has a length between 10 and 10000 meters.

5. The hoisting system according to claim 1, wherein the first diameter of the first part of the hoisting rope is between 5 mm and 300 mm.

6. The hoisting system according to claim 1, wherein the second diameter of the second part of the hoisting rope is between 25 mm and 500 mm.

7. A method for hoisting a vertically-suspended object with a hoisting system, the hoisting system having a winch having a winch drum with a hoisting rope, wherein a first part of the hoisting rope has a first diameter and a second part has a second diameter being larger than the first diameter, the first part being connected with a first end of the second part, at a transition region, the transition region including at least one tapering region and having diameters at opposite ends corresponding to the first diameter and the second diameter respectively, wherein the first part is an inner part on the winch drum when the winch drum is completely wound, wherein the second part has a further end that is connectable to the object for hoisting the object, wherein a ratio between the first diameter and the second diameter is chosen such that the minimum breakable load of the first part differs less than a factor of four from the minimum breakable load of the second part, the method comprising a step of hoisting the object either into or from the water, such that the second part of the winch drum is always at least partially wound on the winch drum before the object is lifted out of the water during lifting of the object, and such that the first part is unwound from the winch drum only after the object is fully submerged in the water during lowering of the object.

8. The method according to claim 7, wherein the method comprises steps of:
mounting an object resting on a first surface at a first position to the further end of the hoisting rope, wherein the second part has been partially unwound from the winch drum;
lifting the object with the winch from the first surface to suspend the object in the hoisting rope, wherein the second part remains partially wound on the winch drum, wherein during the lifting the second part carries the full weight of the object;
moving the hoisting system to a second position above water, wherein the second part carries the full weight of the object;
lowering the object with the winch until it is fully submerged in the water, wherein the second part remains at least partially wound on the winch drum until the object is fully submerged; and
further lowering the object with the winch into the water completely unwinding the second part and at least partially unwinding the first part from the winch drum, wherein the first part is exposed to a reduced effective weight of the object due to buoyancy forces acting by the water on the object and the hoisting rope.

9. The method according to claim 8, wherein, in the step of lowering the object, at least a predefined number of windings of the second part remain on the winch drum until the object is exactly fully submerged.

10. The method according to claim 7, wherein the method comprises steps of:
mounting an object that is submerged in water at a second position to the further end of the hoisting rope, wherein the second part has been fully unwound and the first part has been at least partially unwound from the winch drum;
lifting the object with the winch to suspend the object in the hoisting rope, wherein the first part is wound on the winch drum until the second part is partially wound on the winch drum while the object is still submerged, wherein during the lifting the first part carries a reduced effective weight of the object due to buoyancy forces acting by the water on the object and the hoisting rope;

further lifting the object with the winch out of the water, wherein the second part is being further wound on the winch drum;

moving the hoisting system to a first position, wherein the second part carries the full weight of the object; and lowering the object with the winch to touch a first surface at the first position, wherein still only the second part is partially unwound from the winch drum.

11. The method according to claim 10, wherein, in the step of lifting the object, at least a predefined number of windings of the second part are wound on the winch drum before the object is no longer fully submerged.

12. A winch having a winch drum with a hoisting rope, wherein a first part of the hoisting rope has a first diameter and a second part has a second diameter being larger than the first diameter, the first part being connected with a first end of the second part, at a transition region, the transition region including at least one tapering region and having diameters at opposite ends corresponding to the first diameter and the second diameter respectively, wherein the first part is an inner part on the winch drum when the winch drum is completely wound, wherein the second part has a further end that is connectable to the object for hoisting the object, wherein a ratio between the first diameter and the second diameter is chosen such that the minimum breakable load of the first part differs less than a factor of four from the minimum breakable load of the second part.

13. The hoisting system according to claim 1, wherein the hoisting rope is configured to lift the object from being fully submerged in the water to being above the water when a weight of the object is less than the minimum breakable load of the second part and more than the minimum breakable load of the first part.

14. The method according to claim 7, wherein the hoisting rope is configured to lift the object from being fully submerged in the water to being above the water when a weight of the object is less than the minimum breakable load of the second part and more than the minimum breakable load of the first part.

15. The winch according to claim 12, wherein the hoisting rope is configured to lift the object from being fully submerged in the water to being above the water when a weight of the object is less than the minimum breakable load of the second part and more than the minimum breakable load of the first part.

* * * * *